United States Patent [19]

Oldenkamp

[11] Patent Number: 4,494,657
[45] Date of Patent: Jan. 22, 1985

[54] INTEGRAL HOUSING MEMBER FOR REMOVING MAGNETIC ARTICLES FROM A FLOW OF LOOSELY PACKED MATERIAL AND METHOD

[76] Inventor: Jerry Oldenkamp, 3202 Campanil Dr., Santa Barbara, Calif. 93109

[21] Appl. No.: 450,658

[22] Filed: Dec. 17, 1982

[51] Int. Cl.³ .............................................. B07C 5/344
[52] U.S. Cl. ................................... 209/636; 209/219; 384/439; 220/1 T; 206/818
[58] Field of Search .................... 209/636, 926, 223 A, 209/223 R, 222, 224, 213–216, 219, 229; 220/287, 1 T; 403/260, 258, 259, 167; 384/428, 439, 440; 206/818

[56] References Cited

U.S. PATENT DOCUMENTS

| Re. 28,720 | 2/1976 | Sedlak | 220/287 X |
|---|---|---|---|
| 2,891,824 | 6/1959 | Fulton | 384/440 |
| 4,083,641 | 4/1978 | Sado | 403/260 |
| 4,279,744 | 7/1981 | Antonwitsch | 209/222 X |
| 4,367,138 | 1/1983 | Kustas | 209/636 X |

Primary Examiner—David A. Scherbel
Assistant Examiner—Glenn B. Foster
Attorney, Agent, or Firm—Daniel J. Meaney, Jr.

[57] ABSTRACT

An integral housing member for removing magnetic articles from a flow of loosely packed material containing a mixture of magnetic articles and non-magnetic articles is shown. The integral housing member includes an inlet cover having an elongated opening, a hollowed-out central area and an opening located at the bottom of the integral housing member which terminates in a rim engaging lip having substantially the same diameter as the top opening of the trash receptacle. A magnetic article assembly is positioned below the elongated opening and is adapted to be rotated about the longitudinal axis of an elongated support shaft. The magnetic article assembly includes a plurality of triangular shaped metal plates, magnetic members and non-magnetic members, all of which have an aperture formed in the center thereof which has the elongated support shaft passed therethrough. The metal plates cooperate with each other to form pairs of magnetic retrieving plates wherein the magnetic members have a magnetic flux density of sufficient magnitude to magnetize each plate to produce a preshaped magnetic field which attracts and removes magnetic articles responsive to the magnetic field from a loosely packed material flow which is directed through the inlet cover. A method for removing magnetic articles from a free falling flow of the loosely packed material onto a magnetic article separating assembly is shown.

9 Claims, 13 Drawing Figures

U.S. Patent   Jan. 22, 1985   Sheet 1 of 3   4,494,657
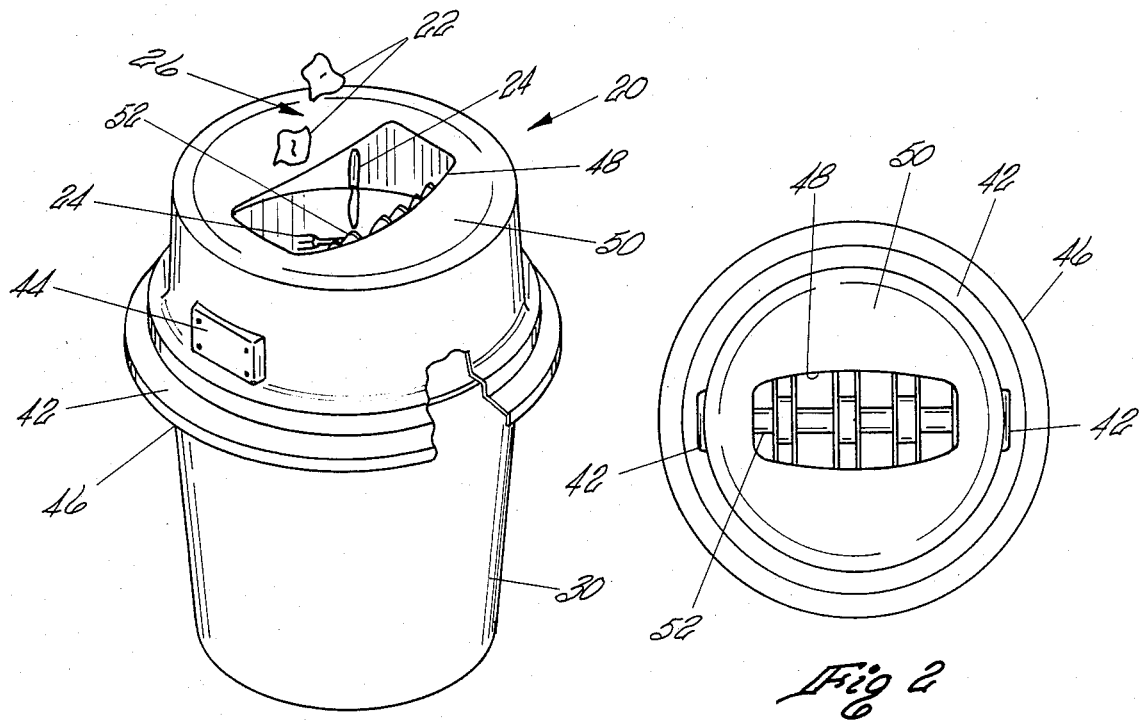
Fig 1
Fig 2
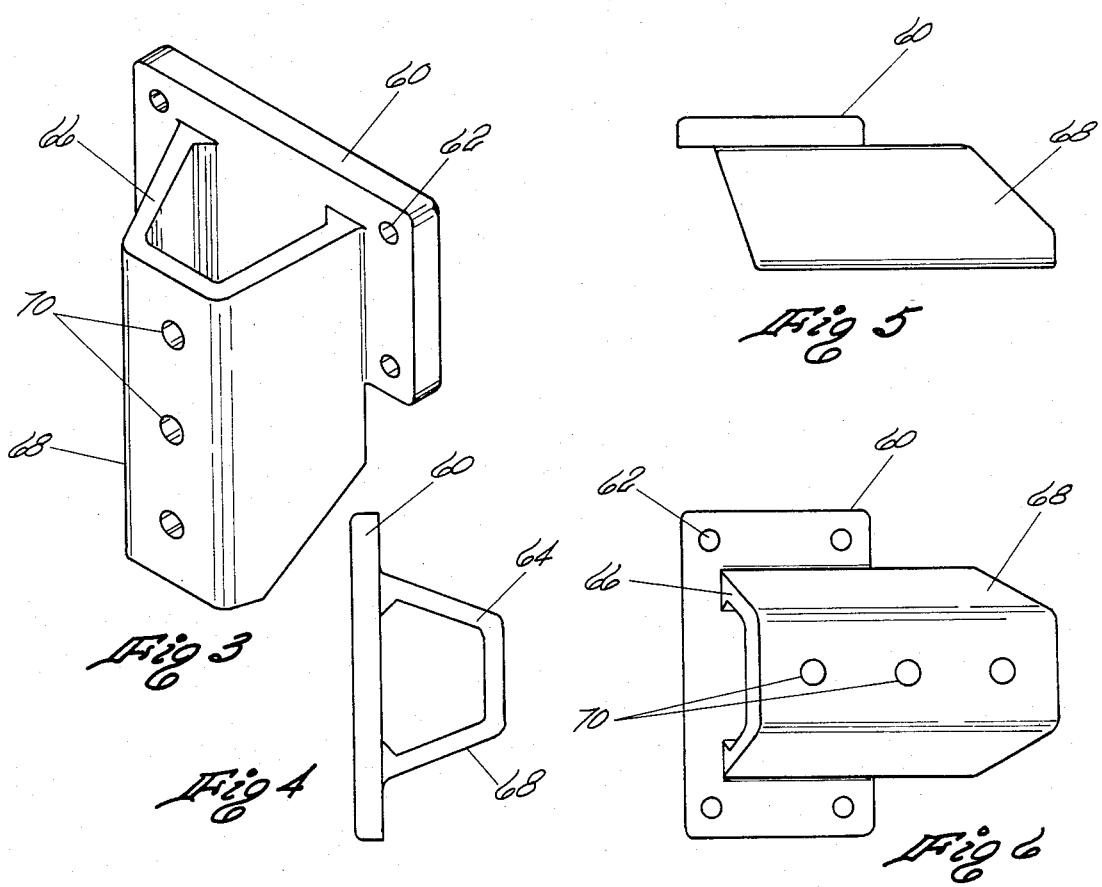
Fig 3
Fig 4
Fig 5
Fig 6

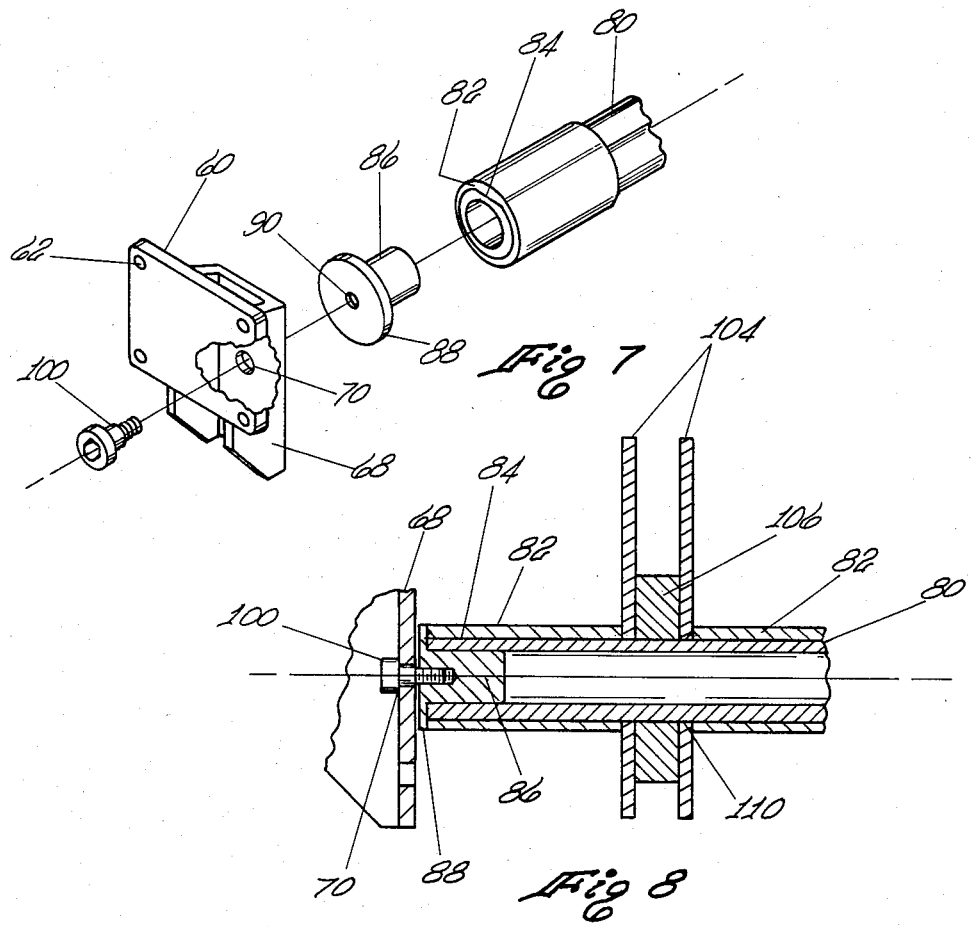
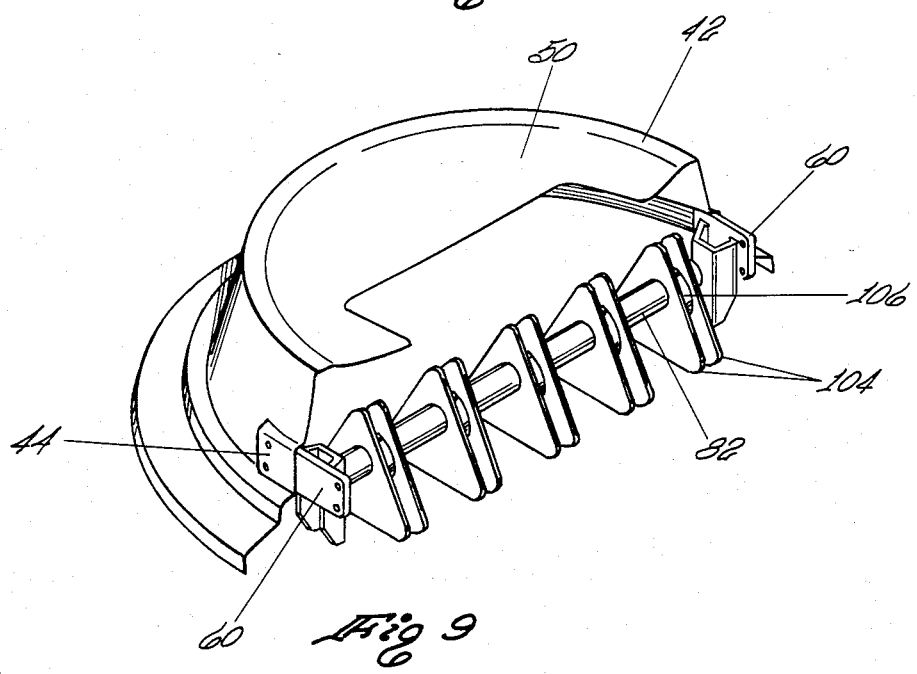

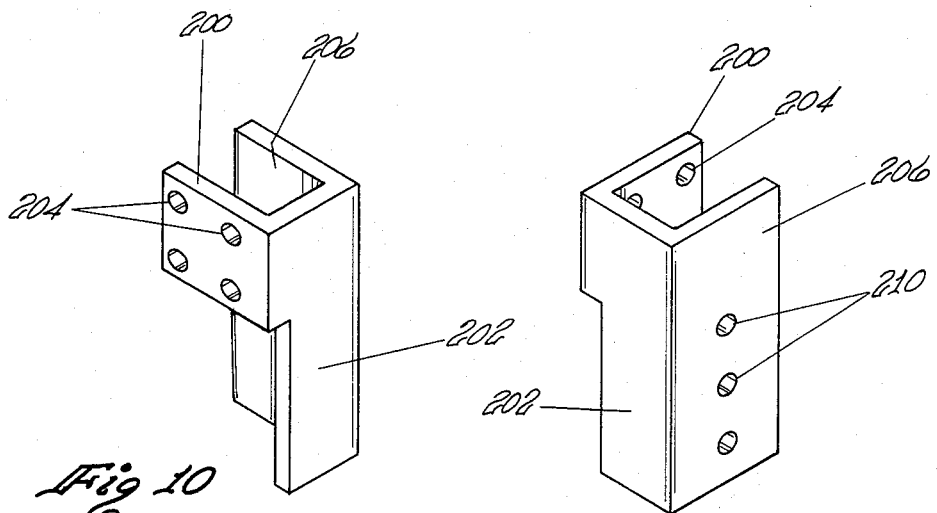
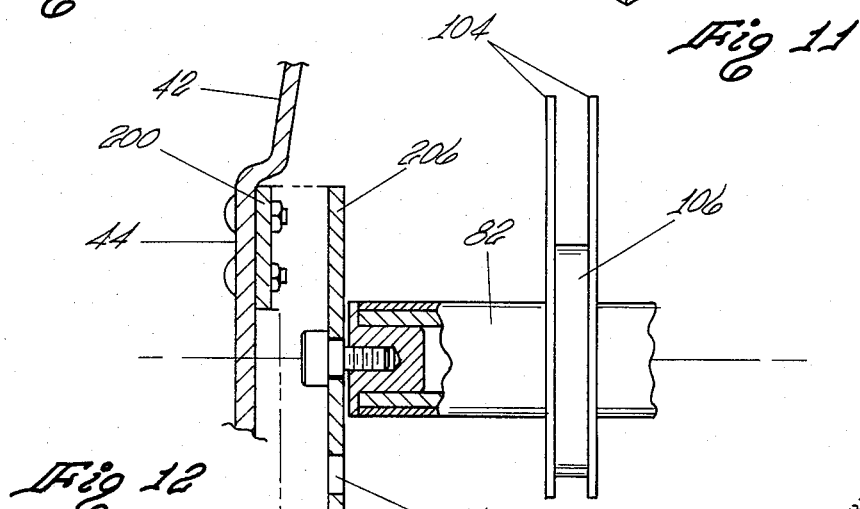
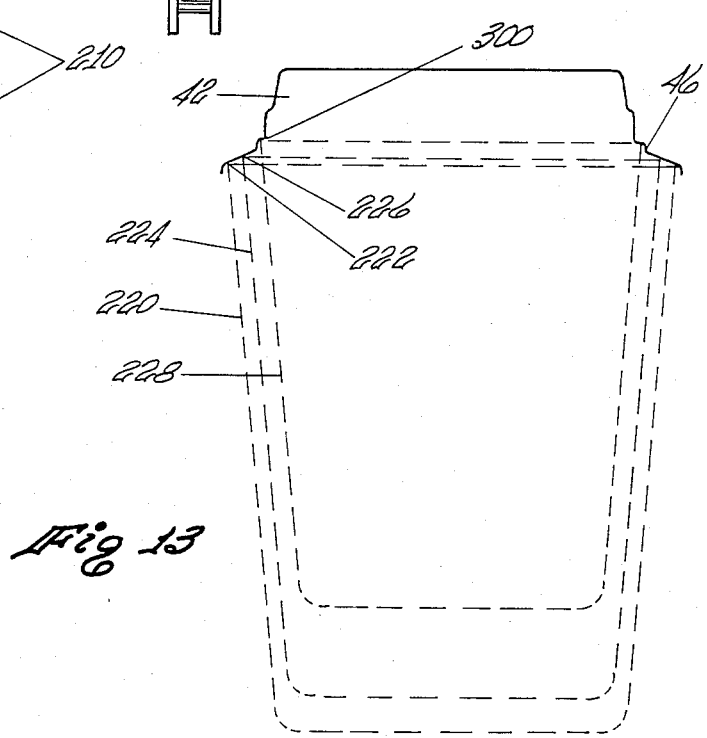

INTEGRAL HOUSING MEMBER FOR REMOVING MAGNETIC ARTICLES FROM A FLOW OF LOOSELY PACKED MATERIAL AND METHOD

BACKGROUND OF THE INVENTION

1. Field of the Invention

This invention relates to apparatus and method for removing magnetic articles from a flow of loosely packed material containing a mixture of magnetic articles and non-magnetic articles. More specifically, this invention relates to an integral housing member having a magnetic article separating assembly located in the interior thereof wherein housing member mounts on the top of a rubbish receptacle for separating metal objects such as tableware and the like from rubbish having food and paper waste and to a method for removing magnetically attracted, reusable tableware and the like from a free fall flow of loosely packed material containing a mixture of magnetic articles and non-magnetic articles passing through the elongated opening and along a predetermined path onto a magnetic article separating assembly in the integral housing member.

2. Description of the Prior Art

Methods and apparatus for separating magnetic articles from a flow of loosely packed material containing a mixture of magnetic articles and non-magnetic articles, such as for example tableware or other metal objects, from rubbish is well known in the art. One apparatus and method is disclosed in U.S. Pat. No. 4,279,744, which is assigned to the inventor hereof, which discloses the use of an exposed and opened apparatus comprising an elongated shaft and a plurality of metal plates separated by magnetic members and non-magnetic members for removing magnetic articles from a flow of loosely packed material which is falling past the exposed apparatus.

Another apparatus and method disclosed in U.S. Pat. No. 3,926,792 automatically separates magnetic substances, such as tableware, from non-magnetic substances, such as food and paper waste. The apparatus disclosed in U.S. Pat. No. 3,926,792 utilizes a conventional endless conveyer belt, pulleys mounted at opposite ends of a steel frame and a pair of magnets mounted inside the interior of the pulley located at the discharge end of the conveyer to establish a magnetic field force extending radially through the conveyer belt around the pulley. The magnetic field attracts the magnetic substances, such as tableware, and holds the same against the surface of the conveyer belt. As the conveyer belt moves around the pulley, the food and paper waste fall from the end of the conveyer belt by gravity into a suitable trash receptacle while the attracted tableware remains against the conveyer belt until the tableware is transported and released into a separate receptacle. A similar method and apparatus, which is used for crushing and separating metallic containers and having a conveyer and magnetic pulley arrangement is disclosed in U.S. Pat. No. 4,084,496.

Other apparatus which utilize conveyer belts and a magnetic pulley or magnetic drum for separating magnetic materials from non-magnetic materials are disclosed in U.S. Pat. Nos. 2,844,251 and 2,964,184, respectively.

Apparatus for salvaging metal articles from rubbish is disclosed in U.S. Pat. No. 2,913,113 and utilizes a rotating drum having an inlet for receiving rubbish containing the metal articles and internal fins which agitate the rubbish into a falling stream of loose mixed rubbish. The rubbish stream falls near a helical magnet extending axially through the center of the drum wherein the helical magnet attracts the metal articles thereagainst and transports the same axially to the end thereof where the metal articles are removed therefrom. The non-magnetic substances forming the balance of the rubbish are discharged from the outlet of the drum.

A circular magnet in combination with a spinning non-magnetic disc member wherein the magnetic field developed from the magnet attracts and separates magnetic parts from rubbish into engagement with a spinning disc and the disc impells the separated magnetic part along a predetermined path for collection thereof is disclosed in U.S. Pat. No. 2,766,887.

Magnetic separators having various shapes and sizes of coaxially aligned magnetic members are disclosed in U.S. Pat. Nos. 1,129,822; 2,858,021; 2,094,615; 2,992,733; 2,992,734; 3,998,741 and 4,046,680. One magnetic separator having axially aligned magnets is disclosed in U.S. Pat. No. 3,960,716 and relates to a magnetic separator for dry and wet material containing magnetically attractable particles. The magnetic separator includes a stationary vertical housing which provides a vertical path for gravity movement of material within the housing and a rotating magnetic system concentrically arranged along the vertical axis of the housing. The magnetic system which is rotated by a drive means, comprises a plurality of magnetic discs and pole discs alternating with the magnetic discs in the axial direction of the housing.

SUMMARY OF THE INVENTION

The present invention discloses a novel and unique integral housing member having an elongated opening in the top thereof to receive and direct along a predetermined path a flow of loosely packed material containing a mixture of magnetic articles and non-magnetic into engagement with a magnetic article separating assembly for removing and holding magnetic articles while passing the non-magnetic articles into a waste receptacle adapted to be located directly below the housing member. In the preferred embodiment, the integral housing member has an inlet cover which has a hollowed-out central area, a bottom opening which is adapted to be placed onto the opening of a rubbish receptacle and an elongated top opening which is adapted to define an inlet which receives and passes a flow of loosely packed material along a predetermined path over a magnetic article separating assembly for separating the magnetic articles from the non-magnetic articles contained in the flow of rubbish material. The magnetic article separating assembly includes an elongated support shaft which is adapted to be mounted in the inlet cover such that the shaft is rotatable about its longitudinal axis. A plurality of triangular metal plates are coaxially aligned in spaced parallel relationship with each other to form pairs of magnetic retrieving plates which are coaxially aligned with and mounted on the elongated support shaft so as to be rotatable therewith. Each of the magnetic retrieving plates extend substantially vertically outwardly from the elongated support shaft and each have a periphery which is adapted to engage and be rotated by the flow of loosely packed material impacting against the periphery thereof. A plurality of magnetic members, which are coaxially aligned with and mounted on the elongated support shaft, are located one in each of the spaces between each pair of the triangular magnetic retrieving plates and in axial alignment with and contiguous therewith. The magnetic members extend substantially vertically outwardly from the support shaft and has a periphery spaced a predetermined distance from the periphery of each of the magnetic retrieving plates. The magnetic members are formed of a magnetic material having a magnetic flux density of a sufficient magnitude to magnetize each magnetic retrieving plate and to produce a preshaped magnetic field emanating therefrom and therebetween which attracts and removes magnetic articles responsive to the magnetic field from the material flow being directed along the predetermined path through the inlet and across the magnetic retrieving plates. The magnetic field emanating from the magnetic retrieving plates hold the removed magnetic articles thereagainst as the material flow being directed thereacross rotates the entire magnetic article separating assembly.

This invention also relates to a novel and unique method for removing from a flow of loosely packed material containing a mixture of magnetic articles and non-magnetic articles including food and paper waste passing through an elongated opening defining an inlet in an inlet cover of an integral housing member mounted onto the top of a trash receptacle magnetically attracted, resuable tableware and the like.

The known prior art devices for separating magnetic substances, such as tableware, from non-magnetic substances such as food and paper waste generally comprise apparatus which are fairly large in size or which directly expose the magnetic apparatus to the user. The user is required in the prior art devices to dump the flow of loosely packed material so that the same comes into contact with the magnetic apparatus in order to effectively remove the magnetic articles therefrom, also, depending on the volume of material dumped on the aparatus, the user must rotate the apparatus manually.

In addition, certain of the apparatus have a plurality of moving parts including endless conveyer belts, magnetic pulleys and the like. Other known apparatus for salvaging metal articles from rubbish utilize rotating drums, elongated rotating helical magnets located axially to the center of the drums or combinations of circular magnets and spinning non-magnetic disc members for attracting and separating magnetic parts from rubbish, all of which require bulky apparatus, driving means and associated mechanisms to attract, separate and transport magnetic articles from non-magnetic articles contained in the rubbish.

The present invention discloses an integral housing member having a magnetic article separating assembly located therein for removing magnetic articles from a flow of loosely packed material containing a mixture of magnetic articles and non-magnetic articles. In use, the flow of loosely packed material is placed onto the inlet cover which directs same through an elongated opening defining an inlet in the top of the inlet cover. The elongated opening defines a predetermined material flow onto the magnetic article separating assembly and eliminates the necessity for exposed, manually rotatable separating apparatus, endless conveyer belts having magnetic pulleys, drive means, helical magnets or other large or complicated transporting and separating apparatus.

One advantage of the present invention is that the integral apparatus housing member and its associated inlet cover, adjustable height support brackets and magnetic article separating assembly for removing magnetic articles is relatively simple in contruction. The integral housing member is formed of a minimum number of mechanical components and is adapted to be rotated solely by the free fall of the flow of loosely packed material containing a mixture of magnetic articles and non-magnetic articles including food and paper waste.

Another advantage of the present invention is that the integral housing member has a size and weight so that the same can be easily positioned onto the top rim of a conventional trash collection receptacle for use and can be easily removed when the receptacle is full and needs to be emptied of trash. The integral housing member when positioned onto the top rim of a trash receptacle, is adapted to have rubbish dumped onto the inlet cover such that a flow of loosely packed material containing a mixture of magnetic articles and non-magnetic articles is then directed by a ramp surface to an inlet which then meters the flow of loosely packed material along a predetermined path onto the magnetic article separating assembly. Thus, rubbish can be dumped onto the integral housing member located on top of a trash receptacle in a normal manner.

A yet further advantage of the present invention is that the apparatus is formed of a plurality of triangular shaped metal plates and a plurality of magnetic members interspersed between the plates resulting in a simple apparatus having a strong preshaped magnetic field emanating therefrom and therebetween such that pairs of magnetic retrieving plates continually intercept the material flow and attract magnetic articles.

A still further advantage of the present invention is that the integral housing member can be used without the necessity of exposed, manually rotatable apparatus, complex conveyer belts, driving means for rotating the magnetic assembly and separate collecting means for receiving and storing the magnetic articles removed from the flow of loosely packed material containing a mixture of magnetic articles and non-magnetic articles.

A still yet further advantage of the present invention is that the apparatus for removing the magnetic articles is relatively economical to construct, can be used in small restaurants, shops or businesses which have a relatively low volume of rubbish and which is adapted to be used either as a portable unit which is easily placed onto or removed from a trash receptacle or adapted to be easily moved from one trash receptacle to another trash receptacle when the one trash receptacle becomes full.

A yet still further advantage of the present invention is that integral housing member has an inlet cover which includes a multi-level, annular shaped rim engaging lip defining the bottom opening such that the rim engaging lip can be placed onto one of a plurality of trash receptacles having different size openings.

A still yet further advantage of the present invention is that the inlet cover of the integral housing member includes means defining a ramp surface such that the flow of loosely packed material is directed to the inlet in the form of an elongated opening which meters and directs the flow thereof along a predetermined path into engagement with the magnetic articles separating assembly enabling the pairs of metal retrieving plates to intercept the falling material flow which, in turn, rotates the pairs of magnetic retrieving plates such that the periphery thereof continually intercept the material flow and attract any magnetic articles located therein.

BRIEF DESCRIPTION OF THE DRAWING

These and other objects and advantages of the invention, together with its various features and advantages, can be more easily understood from the following more detailed description of the preferred embodiment taken in conjunction with the accompanying drawing in which:

FIG. 1 is a perspective view of a integral housing member including magnetic article separating assembly using the teachings of this invention which is removably mounted on the top rim of a trash receptacle;

FIG. 2 is a top plan view of the housing member showing the magnetic article separating apparatus mounted therein;

FIG. 3 is a perspective view of one embodiment, a mounting bracket for rotatably supporting the elongated shaft at a selected distance from the elongated opening defining the inlet in the inlet cover portion of the integral housing member;

FIG. 4 is a top plan view of the bracket shown in FIG. 3;

FIG. 5 is a side plan view of the bracket shown in FIG. 3;

FIG. 6 is a perspective view of the bracket shown in FIG. 3 showing the mounting flange and mounting aperature located in the support channel of the bracket of FIG. 3;

FIG. 7 is an exploded, partial assembly view showing the preferred method for mounting the elongated shaft to the bracket;

FIG. 8 is a partial sectional view of the elongated shaft and the triangular metal plates, magnetic members and non-magnetic members supported thereby with the elongated shaft mounted to the bracket of FIG. 3 for rotation relative thereto;

FIG. 9 is a perspective view of the integral housing member shown in a partial section illustrating the preferred embodiment of the magnetic articles separating assembly mounted at a selected distance from the top of the inlet cover;

FIG. 10 is a front perspective view of another embodiment of a mounting bracket for rotatably supporting the magnetic article separating assembly at a selected distance from the elongated opening defining the inlet in the inlet cover of the integral housing member;

FIG. 11 is a rear perspective view of the embodiment of the mounting bracket of FIG. 10;

FIG. 12 is a partial sectional view of the elongated shaft and the triangular metal plates, magnetic member and non-magnetic members supported thereby with the elongated shaft mounted to the bracket illustrated in FIGS. 10 and 11 for rotation relative thereto; and FIG. 13 is a pictorial view of the integral housing member illustrating how the rim engaging lip is adapted to be mounted on a plurality of trash receptacles having various sized openings.

DESCRIPTION OF THE PREFERRED EMBODIMENT

In FIG. 1, the integral housing member including the magnetic article separating assembly is generally designated by arrow 20. The magnetic articles to be removed, which may be reusable tableware and the like, such as silverware 24, are contained in a flow of loosely packed material 26, which contains a mixture of magnetic articles 24 and non-magnetic articles 22. Typically, the non-magnetic articles 22 include rubbish collected from the operation of a business such as a restaurant business or the like and may comprise food and paper waste. In a typical food service business, the rubbish or trash is collected in collection receptacles, such as a barrel shaped trash receptacle 30.

The integral housing member 20 includes an inlet cover 42 which supports a magnetic article separating assembly 52. In the preferred embodiment, the integral housing member 20 is a portable or removable device which is adapted to be mounted upon the top of a number of different conventional trash receiving receptacles having different sizes of top rims and openings.

In the food service business, which includes restaurants, hospitals, schools and the like, during peak operating times it is necessary to clear tables or counters as rapidly as possible in order to permit same to be used again. Typically, the service personnel will clear the table or counter of dishes, paper, leftover food, tableware and the like, with the result that reusable articles such as tableware, tea pots and the like, normally fabricated from magnetic material, inadvertently become commingled with other waste when collected in trays, baskets, pans, carriers and the like. Such waste or rubbish is in the form of a loose mixture comprising magnetic articles such as a knife and fork 24 and non-magnetic articles 22.

In order to provide the user with the minimum problems and the maximum table turn-around time, the service personnel do not have time to inspect the rubbish and manually remove the magnetic articles or to manually dump same onto a complicated assembly and manually rotate same.

The integral housing member 20 of FIGS. 1 and 2 has an inlet cover 42 which permits the integral housing member 20 to be mounted directly by means of the rim engaging lip 46 onto the top of trash receptacle 30. This arrangement allows the service personal to dump the rubbish 26 in a normal manner except that the rubbish is dumped onto the inlet cover 42 whereupon the separation process is performed. The inlet cover 42 has a ramp surface 50 which slopes inwardly towards the inlet defined by elongated opening 48. The elongated opening 48 performs two essential functions: (1) it meters the flow of loose material 26; and (2) defines a predetermined path for the material flow to insure that the loose material is directed onto the magnetic article separating apparatus 52 which is rotatably mounted onto the inlet cover 42 at mounting surfaces 44.

FIG. 2 clearly illustrates that the elongated opening 48 defines a predetermined path to direct the entire material flow into engagement with magnetic article separating assembly 52.

In the preferred embodiment illustrated in FIGS. 1 and 2, the magnetic article separating assembly 52 is mounted at a selected distance below to the elongated opening 48 and is adapted to be rotated by the falling loose material. As the magnetic article separating assembly 52 is rotated, the non-magnetic articles 22 fall into the trash receptacle 30 while the magnetic articles 24 are held by the pairs of magnetic retrieving plates.

The bracket illustrated in FIGS. 3 to 6 is adapted to support the magnetic article separating assembly 52 in the proper position below elongated opening 48 while permitting the assembly 52 to be rotated by the free falling material 26.

In FIGS. 3 to 6, the bracket includes a mounting flange 60 and a support channel 68 having a "U" shaped section 66. The mounting flange 60 includes fastener receiving apertures 62 for mounting the bracket to bracket receiving section 44 of the inlet housing 42 as illustrated in FIGS. 1 and 2.

The support channel 68 includes three spaced, aligned openings 70 which are adapted to rotatably support the magnetic article separating assembly at different heights relative to the elongated opening 48.

FIG. 7 illustrates the details of the bracket having the magnetic article separating assembly 52 mounted thereon.

The magnetic article separation assembly includes an elongated support shaft 80 which has a flat edge 84 located on the periphery thereof which extends in a direction which is substantially parallel to the axis of elongation of the elongated shaft 80.

A non-magnetic space 82 is positioned over the periphery of the elongated shaft 80 and spaces the triangular metal plate 104, shown in FIG. 8, from the bracket.

An end cap 86 having an enlarged, disc-shaped plate 88 functions both as an end cap to hold the assembly 52 together and as a pivot support to permit the elongated support shaft 80 to be rotated about its axis. The end cap 86 is selected to have a dimension such that it can be "force-fitted" into the open center portion of shaft 80. The disc-shaped plate 88 is selected to have a diameter so as to extend to the edge of the non-magnetic spacing member 82 as illustrated in FIG. 8.

The disc-shaped plate 88 includes a self-tapping aperture 90 which is adapted to receive and hold a shoulder-type threaded fastener 100. The shoulder portion of fastener 100 cooperates with and loosely passes through aperture 70 in the channel support 68.

FIG. 8 illustrates the details of the fully assembled magnetic article separating assembly 52. The channel portion of the channel shaped member 68 supports the shoulder-type threaded fastener 100 within the aperature 70 such that the entire magnetic article separating assembly 52 including the fastener 100 is rotatable with the bracket. The elongated support shaft 80 receives and is passed through the plurality of triangular shaped metal plates 104, the plurality of magnetic members 106 and the plurality of non-magnetic members 82. Each of the above are adapted to be assembled on the elongated support shaft 80 so as to be rotatable therewith.

In the preferred embodiment, the elongated support shaft 80 has a flat edge located on the periphery thereof which extends in a direction which is substantially parallel to the axis of elongation of the elongated support shaft 80. The apertures in the center of each of the triangular shaped metal plates, the magnetic members and the non-magnetic members have a flat sector portion thereof formed therein which is adapted to cooperate with the flat edge of the elongated support shaft 80 such that the flat edge of the shaft 80 is contiguous the flat sector portion of each of the above described elements resulting in a simple, easily assembled magnetic article separating assembly wherein all of the components are rotatable as an integral assembly. This is necessary in that as the flow of material engages the edges of the metal receiving plates and other elements of the assembly, the entire assembly is capable of being rotated thereby.

As illustrated in FIG. 8, each end of the elongated support shaft 82 can be capped with an end cap 86. This permits loading of the various elements onto the elongated support shaft 80 in the appropriate array and the entire assembly is held together with both end caps 86 which are "force-fitted" into the central opening of the elongated support shaft 80.

FIG. 9 illustrates the magnetic article assembly 52 rotatably mounted on the support channel 68 of the bracket. The mounting flange 60 of the bracket is mounted onto the bracket receiving portion 44. In the embodiment illustrated in FIG. 9, five pairs of magnetic retrieving plates are shown, each of which comprise a pair of triangular shaped metal plates 104 having a magnetic member 106 located in the space between the plates 104.

The plurality of a magnetic members 106 are coaxially aligned with and mounted on the elongated support shaft 80 and are positioned in the space between each pair of magnetic retrieving plates 104 and in axial alignment with the elongated support shaft 80. The plurality of magnetic members each extend substantially vertically outwardly from the elongated support shaft 80 with the periphery thereof spaced a predetermined distance from the periphery of the triangular members. The magnetic members are formed of a magnetic material having a magnetic flux density of sufficient magnitude to magnetize each plate to produce a preshaped magnetic field emanating therefrom and thereacross to attract and remove magnetic articles responsive to the magnetic field from a material flow being directed thereacross and to hold such removed magnetic articles against the magnetic retrieving plates as the plates move relative to the material flow being directed thereacross.

In addition, the plurality of non-magnetic spacing members 82 are coaxially aligned with the elongated support shaft 80 and positioned intermediate each subassembly comprising a pair of magnetic retrieving plates 104 and a magnetic member 106 to form a spacing intermediate each subassembly which, in the preferred embodiment, is greater that the space between each pair of magnetic retrieving plates containing the magnetic member 106.

FIGS. 10 and 11 illustrate another embodiment of a different bracket which is easily fabricated from "U" shaped channel stock. The front portion 204 is equivalent to the mounting flange 60 and has apertures 204 for affixing the bracket to the bracket receiving portion 44 of the inlet cover 42 as illustrated in FIGS. 1 and 2. The rearward portion 206 is equivalent to the support channel 68 and contains height adjusting apertures 210 which are adapted to receive and support the shoulder-type fastener 100 which has the threaded end thereof affixed in the central aperture 90 of the end cap 86. Side 202 is of sufficient thickness to position the magnetic article separating assembly 52 within the hollowed-out central area of the inlet cover 42 and between the aligned, separated bracket receiving portions 44 of the inlet cover 42. FIG. 12 illustrates the magnetic article separating assembly 52 rotatably mounted by fastener 100 onto the support surface 206 of the "U" shaped bracket. Each pair of magnetic retrieving plates 104 and magnetic member 106 is spaced from the bracket and from each subassembly by the non-magnetic spacing members 82.

In the event that a user determines that the spacing between the magnetic article separating assembly 52 and the elongated opening 48 in the inlet cover 42 should be changed, the fastener 100 is removed from the aperture 90 of end cap 88 passed through a different selected supporting aperture 210.

In FIG. 13, the integral housing member 20 is illustrated pictorially with its rim engaging lip 46 actually having multi-level, annular shaped rim engaging lips 222, 226 and 300. The purpose of the multi-level rim engaging lips is to permit the integral housing member 20 to be mounted on a plurality of trash receptacles having various sized openings. For example, a plurality of different trash receptacles having openings corresponding to the dashed receptacles 220, 224 and 228 are adapted to engage an appropriate rim engaging lip 222, 224 and 226, respectively, of the inlet cover 42. Thus, the integral housing member 20 has an inlet cover 42 which includes a multi-level, annular shaped rim engaging lip defining the bottom opening such that the rim engaging lip can be placed onto one of a plurality of trash receptacles having different size openings.

The preferred embodiment as disclosed herein is adapted for use in the food service industry generally and the restaurant and institutional markets specifically. However, the concept of an integral housing member having an inlet cover which includes an opening to meter and direct a flow of loosely packed material along a predetermined path onto a magnetic article separating assembly which is adapted to remove magnetic material therefrom and to hold the so separated magnetic material has wide applications. For example, the integral housing member can be used to separate magnetic articles, such as blade parts, nails and other metal objects, from fruits and vegtables during food processing operations. Also, in industrial applications, the integral housing member may be used to remove small magnetic parts from rubbish.

Further, the inlet cover performs other functions such as to shield the magnetic article separating assembly during use and to insure that all of the rubbish contacts the assembly as it is emptied onto the inlet cover.

What is claimed is:

1. An integral housing member for removing magnetic articles from a flow of loosely packed material containing a mixture of magnetic articles and non-magnetic articles comprising
   an inlet cover including means defining spaced opposed bracket receiving surfaces adapted to be positioned on the top opening of a trash receptacle, said inlet cover including means defining a hollowed-out central area which terminates in an opening at the bottom thereof having substantially the same diameter as the top opening of a said trash receptacle adapted to receive the inlet cover, said inlet cover including means defining an elongated opening located substantially parallel to and in alignment with the bottom opening;
   an elongated support shaft having a central opening located at each end thereof operatively mounted in said hollowed-out central area of the inlet cover and below and substantially parallel to the axis of said elongated opening, said elongated support shaft being adapted to be rotated about its longitudinal axis;
   a plurality of shaped metal plates having an aperture formed in the center thereof which is adapted to receive and have the elongated support shaft passed therethrough, said plurality of metal plates being positioned in coaxial spaced parallel relationship with each other and in coaxial alignment with and mounted relative to said elongated support shaft so as to be rotatable therewith, each of said plurality of metal plates being adapted to cooperate with one other adjacent metal plate to form a pair of magnetic retrieving plates having a space therebetween, each of said metal plates extending substantially vertically outwardly from the elongated shaft and each having angular points thereon which are adapted to engage and be rotated by the material flow being directed thereacross;
   a plurality of a magnetic members coaxially aligned with and mounted on said elongated support shaft and located in the space between each pair of metal plates and in axial alignment with the elongated support shaft supporting said metal plates, said plurality of magnetic members each extending substantially vertically outwardly from said elongated support shaft with the periphery thereof spaced a predetermined distance from the periphery of said metal members, said magnetic members being formed of a magnetic material having a magnetic flux density of sufficient magnitude to magnetize each metal plate to produce a preshaped magnetic field emanating therefrom and thereacross to attract and remove magnetic articles responsive to the magnetic field from a material flow being directed across said metal plates and to hold such removed magnetic articles against said metal plates as the metal plates move relative to the material flow being directed thereacross;
   a plurality of non-magnetic spacing members coaxially aligned with said elongated support shaft and positioned between each set of the plurality of shaped metal plates to form a spacing between each pair of magnetic retrieving plates;
   a support means operatively coupled to the interior of the inlet cover and mounted relative to the elongated opening in the hollowed-out central area to position said elongated support shaft and said plurality of shaped metal plates, magnetic members and non-magnetic members mounted on the elongated support shaft at a preselected distance from and substantially parallel to said elongated opening and for rotatably supporting the same in a selected position relative to said elongated opening as a said material flow is being directed across said magnetic retrieving plates and to hold such removed metal articles thereagainst as the same is moved relative to the material flow being directed thereacross, said supporting means comprising a pair of brackets each having a mounting plate and a support channel, said mounting plated being adapted to be affixed to the bracket receiving portion of said inlet cover and said support channel being located in an opposed spaced relationship to said mounting plate and adapted to rotatably support said elongated support shaft, each of the support channels of the brackets including a support aperture therein;
   a first and second end cap terminating in a disc-shaped plate which is of a greater external radial dimension than that of the elongated support shaft, each of said end caps being adapted to be force-fitted into the central opening at each end of the elongated support shaft, each of said end caps having a central aperture formed therein; and
   a pair of shoulder-type threaded fasteners located one at each end of the end caps and positioned to pass through the support aperture of its respective bracket and into the central aperture of its respective end cap to rotatably support the elongated support shaft on the support channel at a predetermined space from the elongated opening in the inlet cover.

2. The integral housing member of claim 1 wherein each of the plurality of shaped metal plates are triangular in shape.

3. The integral housing member of claim 1 wherein the elongated support shaft has a flat edge located on the periphery thereof which extends in a direction which is substantially parallel to the axis of elongation of the elongated support shaft and wherein each of the magnetic members and the non-magnetic members have a central aperture which is adapted to receive and pass the elongated support shaft and wherein each aperture has a flat sector portion thereof formed therein which is adapted to cooperate with the flat edge of the elongated support shaft such that the flat edge of the elongated shaft is contiguous the flat sector portion of each magnetic member and each non-magnetic member enabling the entire assembly to rotate as an assembly.

4. The integral housing member of claim 1 wherein said inlet cover includes means for defining a ramped, inwardly sloping surface which is adapted to direct a flow of loosely packed material into said elongated opening of the inlet cover.

5. The integral housing member of claim 1 wherein said bracket has a mounting flange and a "U" shaped support channel, said mounting flange being adapted to be affixed to the bracket receiving portion of the inlet cover and the "U" shaped support channel is adapted to rotatably support said elongated support shaft.

6. The integral housing member of claim 1 wherein said bracket is a "U" shaped channel member having a first side which functions as a mounting flange, a second side which functions as a support channel and a third side which has a selected thickness to space the elongated support shaft from the inlet cover, said mounting flange being adapted to be affixed to the bracket receiving portion of the inlet cover and support channel being adapted to rotatably support said elongated support shaft.

7. The integral housing member of claim 1 wherein said inlet cover includes means for defining a rim engaging lip which is located around and defines the peripheral edge of the bottom open in the inlet cover.

8. The integral housing member of claim 7 wherein said rim engaging lip includes means defining a multi-level, annular shaped rim engaging lips enabling the integral housing member to be mounted on a plurality of trash receptacles having various sized openings.

9. The integral housing member of claim 2 wherein the spacing is intermediate each pair of magnetic retrieving plates containing a magnetic member is greater that the spacing between the triangular shaped metal plates having the magnetic member therebetween.

* * * * *